UNITED STATES PATENT OFFICE.

H. L. PATTINSON, OF SCOTT'S HOUSE, ENGLAND.

IMPROVEMENT IN THE MANUFACTURE OF PIGMENTS.

Specification forming part of Letters Patent No. 8,292, dated August 12, 1851.

*To all whom it may concern:*

Be it known that I, HUGH LEE PATTINSON, of Scott's House, near Newcastle-upon-Tyne, England, manufacturing chemist, a subject of the Queen of Great Britain, have invented or discovered a certain new and useful Improvement in the Manufacture of a Certain Compound or Certain Compounds of Lead; and I, the said HUGH LEE PATTINSON, do hereby declare that the nature of my invention and the manner in which the same is to be performed are fully described and ascertained in and by the following statement thereof—that is to say:

I have discovered that when half an equivalent, or thereabout, of lime, soda, potash, ammonia, or barytes is added to one equivalent of chloride of lead, both in solution, the whole of the lead is precipitated as a definite compound of one atom of chloride and one atom of hydrated oxide of lead, which, when dried at 212°, or under, has the composition just stated, or Pb Cl+Pb OHO; but when dried at from 212 to 350° it loses more or less of the atom of water and becomes or approaches to Pb Cl+Pb O. If less than half an equivalent of the alkaline precipitant is employed, the same definite oxychloride of lead is precipitated and some of the chloride of lead remains in solution. This oxychloride of lead is of a brilliant white color, and possesses great body—qualities which render it an excellent pigment and suitable for most purposes to which white lead is commonly applied.

Now, my invention consists of the manufacture and application to useful purposes of this oxychloride of lead, or such other compounds of oxide and chloride of lead as shall result from the mode of manufacture, to be presently described; and I do hereby further declare that the best mode of carrying my invention into practice, as it has appeared to me, is as follows:

Of the alkaline substances just mentioned I decidedly prefer to use lime, because it answers equally as well as soda, potash, ammonia, or barytes, and is much cheaper. When using lime I make a saturated lime-water by throwing an excess of slaked lime into a tank, filling the same with water, plunging the whole up sufficiently, and allowing it to settle until clear. This lime-water, made at the ordinary temperature of 55° or 60° Fahrenheit, will contain in seven hundred and seventy or seven hundred and eighty parts one part of lime, and therefore one cubic foot will contain five hundred and sixty-seven or five hundred and sixty-eight grains of lime. I also make a solution of chloride of lead by dissolving it at the rate of one pound of pure crystallized chloride of lead in one cubic foot and one-fifth of boiling water, for which purpose I have a strong wooden barrel of about one hundred and fifty feet capacity, provided with a revolving agitator moved by engine-power, and into this barrel, filled with boiling water, I introduce one hundred and twenty-five pounds of pure chloride of lead; but as common water always contains some earthy salts, sulphates, or carbonates, or both, which precipitate lead, I add such an excess of the chloride of lead as by previous trials I find will make up for this loss, so as to allow each cubic foot and one-fifth of the solution to hold dissolved, as near as may be, one pound of chloride of lead, or five thousand eight hundred and thirty-three grains per cubic foot, after it is run out of this dissolver into a suitable cistern, fully settled and quite clear. I now mix the clear solution of chloride of lead, while still hot or warm, (because if suffered to become quite cold it would deposit some of the chloride of lead,) with an equal bulk of lime-water, effecting the mixture as rapidly as possible, when the insoluble oxychloride of lead is immediately formed and speedily settles to the bottom of the cistern into which the mixture is run, leaving a clear supernatant liquor, (a weak solution of chloride of calcium,) which may be afterward withdrawn and the precipitate collected and dried in the usual way.

The method of mixing the solution of chloride of lead and lime-water I practice and find to answer well is to have two tumbling-boxes, each of about sixteen cubic feet capacity, which are filled with the two solutions and simultaneously upset into a lower cistern, in which the oxychloride is instantly formed, and from which the mixture flows into settling-cisterns, where the oxychloride subsides. Now one cubic foot of saturated lime-water containing about five hundred and sixty-eight grains of lime and a cubic foot of the solution of chloride of lead described containing five thousand eight hundred and thirty-three grains of chloride of lead, also an equivalent (one hundred and forty) of chloride of lead, requiring about half an equivalent, fourteen of lime, or one-tenth of its weight, to convert the whole of the chloride of lead into the neutral oxychloride Pb Cl+Pb O, it is apparent that rather less than the atomic proportion of lime has been employed; but I have thought it better when operating in a large way to have the lead a little in excess, for when the full half equivalent of lime is used, owing to the difficulty of intimately and rapidly mixing large masses of different fluids, the oxychloride produced occasionally contains a slight excess of oxide, by which its color is somewhat impaired, while no disadvantage is sustained by having a slight deficiency of lime, except that a little chloride of lead goes away in the clear liquor, and this may be recovered by suffering the clear liquor to flow into a tank and throwing down the excess of lead by adding a little more lime-water or any other suitable precipitant. If, however, it is considered desirable to avoid this second precipitation, the full half atom of lime, or the exact quantity required to throw down the whole of the lead, may be used at once, and should there at first be an excess of oxide in the precipitate, and consequently a little chloride of lead in the clear liquor, by stirring up the precipitate among the clear liquor before any of the latter is withdrawn, and agitating the whole well together a few times, the excess of oxide is converted into the oxychloride, and on settling the clear liquor will be found quite free from lead.

I have described the use of pure crystallized chloride of lead; but it is not essential to have it in this form, for rough chloride made from lead ore and its equivalent of muriatic acid boiled to dryness will answer, provided it is well washed, so as to be freed from chlorides of iron, manganese, or other bodies likely to injure the color of the oxychloride to be produced from it.

When rough chloride is employed it is of course necessary to have the proportion of pure chloride contained in it exactly determined beforehand, in order that a proper quantity may be used in the dissolver. If, however, a solution of chloride of lead of uncertain strength is obtained, or lime-water not quite saturated, they can be used with little disadvantage, for it is only necessary to be careful not to add an excess of lime that is not more than the half equivalent, which can be easily secured after a few trials by filling the lime or lead tumbling box more or less with its respective solution, as the trials may direct.

It will not be necessary to detail any particular mode of proceeding with soda, potash, ammonia, or barytes, for if ever it should happen that these bodies could to any pecuniary advantage be used in preference to lime it would obviously be necessary merely to make a solution of each of known strength and to use it with chloride of lead in the way already fully described as applying to lime.

I am aware that a mixed chloride and oxide of lead has been long known under the name of "Turner's yellow," which is made by mixing oxides of lead and common salt. I therefore do not claim this composition of matter; but What I do claim as my invention is—

The new manufacture of either a white or colored pigment by the addition of one-half of an equivalent of lime or other earthy or alkaline base, with one equivalent of chloride of lead, or chloride of lead diffused in water, or however the solution may be obtained, the whole being substantially as hereinbefore specified.

H. L. PATTINSON.

Witnesses:
 JNO. ALCOCK,
  *Lincoln's Inn*,
 JOSEPH MARQUETT,
  *Bishopsgate Churchyd., London.*